United States Patent
Yi et al.

(10) Patent No.: US 10,862,662 B2
(45) Date of Patent: Dec. 8, 2020

(54) METHOD AND APPARATUS FOR SUPPORTING MECHANISMS FOR FLEXIBLE DUPLEX OPERATIONS AT SYMBOL LEVEL IN WIRELESS COMMUNICATION SYSTEM

(71) Applicant: LG ELECTRONICS INC., Seoul (KR)

(72) Inventors: Yunjung Yi, Seoul (KR); Byounghoon Kim, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 16/322,093

(22) PCT Filed: Aug. 10, 2017

(86) PCT No.: PCT/KR2017/008684
§ 371 (c)(1),
(2) Date: Jan. 30, 2019

(87) PCT Pub. No.: WO2018/030812
PCT Pub. Date: Feb. 15, 2018

(65) Prior Publication Data
US 2019/0190687 A1    Jun. 20, 2019

Related U.S. Application Data

(60) Provisional application No. 62/372,868, filed on Aug. 10, 2016.

(51) Int. Cl.
*H04L 5/14* (2006.01)
*H04L 27/26* (2006.01)
(Continued)

(52) U.S. Cl.
CPC ............ *H04L 5/1469* (2013.01); *H04L 5/001* (2013.01); *H04L 5/003* (2013.01); *H04L 5/18* (2013.01); *H04L 27/2602* (2013.01); *H04L 27/2607* (2013.01); *H04L 27/2628* (2013.01); *H04L 5/0007* (2013.01); *H04L 5/0051* (2013.01)

(58) Field of Classification Search
CPC .................................................... H04L 5/0083
See application file for complete search history.

(56) References Cited

U.S. PATENT DOCUMENTS

2009/0122731 A1   5/2009   Montojo et al.
2015/0215107 A1   7/2015   Siomina et al.
(Continued)

OTHER PUBLICATIONS

PCT International Application No. PCT/KR2017/008684, International Search Report dated Oct. 27, 2017, 2 pages.
(Continued)

*Primary Examiner* — Marcus Smith
(74) *Attorney, Agent, or Firm* — Lee Hong Degerman Kang Waimey

(57) ABSTRACT

For fast and dynamic adaptation of downlink (DL) and uplink (UL) resource, DL/UL resource switching at a symbol level or at a sub-symbol level is proposed. In detail, a network node transmits s DL data in a first symbol, and receives UL data in a second symbol, which is the next symbol of the first symbol.

12 Claims, 15 Drawing Sheets

(51) Int. Cl.
    *H04L 5/00*     (2006.01)
    *H04L 5/18*     (2006.01)

(56) References Cited

U.S. PATENT DOCUMENTS

| | | | |
|---|---|---|---|
| 2015/0264683 A1 | 9/2015 | Kim et al. | |
| 2016/0150532 A1 | 5/2016 | Bhushan et al. | |
| 2016/0353475 A1* | 12/2016 | Au | H04L 5/0042 |
| 2019/0052354 A1* | 2/2019 | Roessel | H04L 27/2607 |
| 2019/0116007 A1* | 4/2019 | Yi | H04L 27/2607 |
| 2019/0124680 A1* | 4/2019 | Li | H04L 5/14 |
| 2019/0191441 A1* | 6/2019 | Kusashima | H04W 16/14 |

OTHER PUBLICATIONS

Huawei et al., "Discussion on frame structure for NR," 3GPP TSG-RAN WG1 #85, R1-164032, May 2016, 10 pages.

* cited by examiner

[Fig. 1]
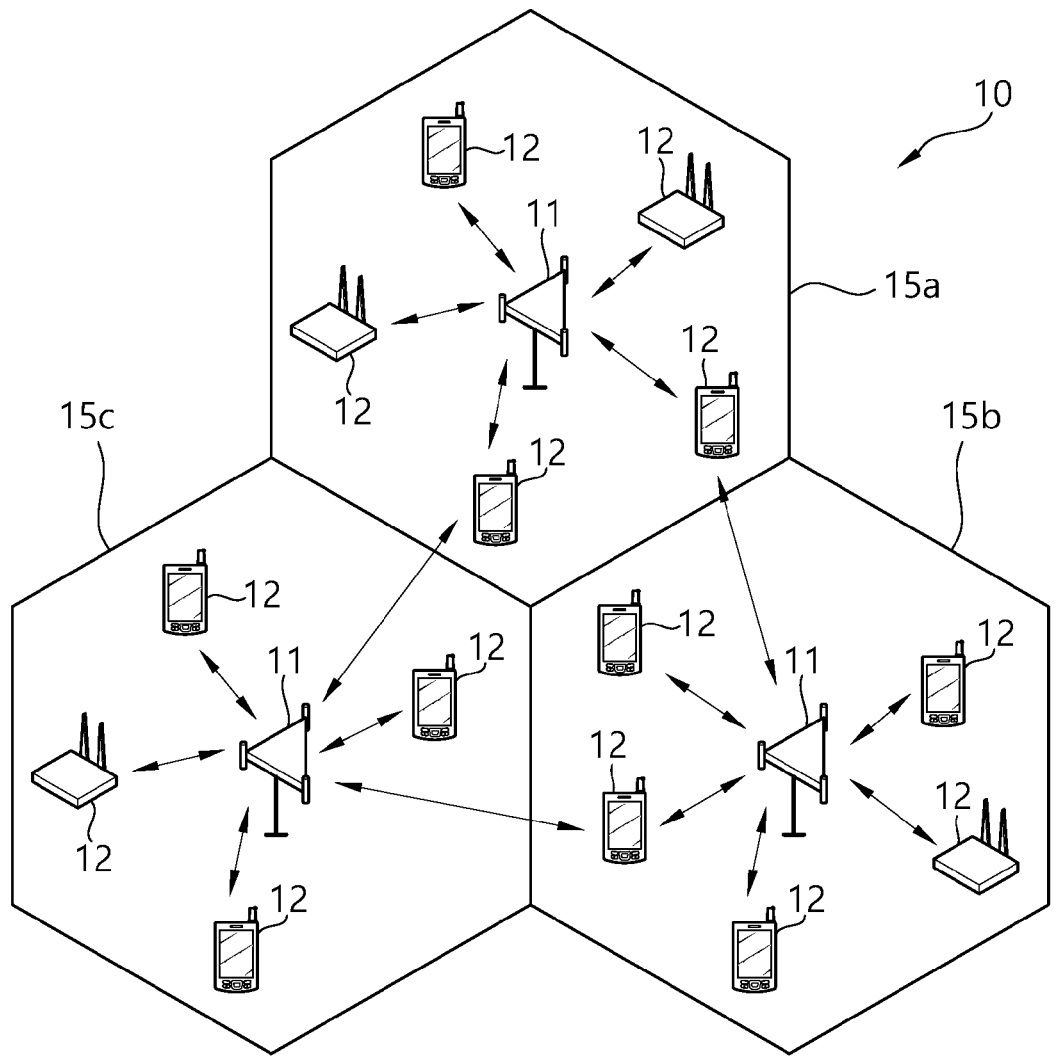
[Fig. 2]
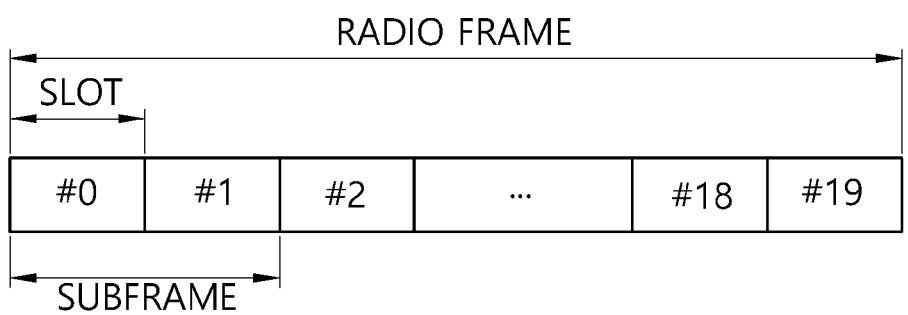

[Fig. 3]
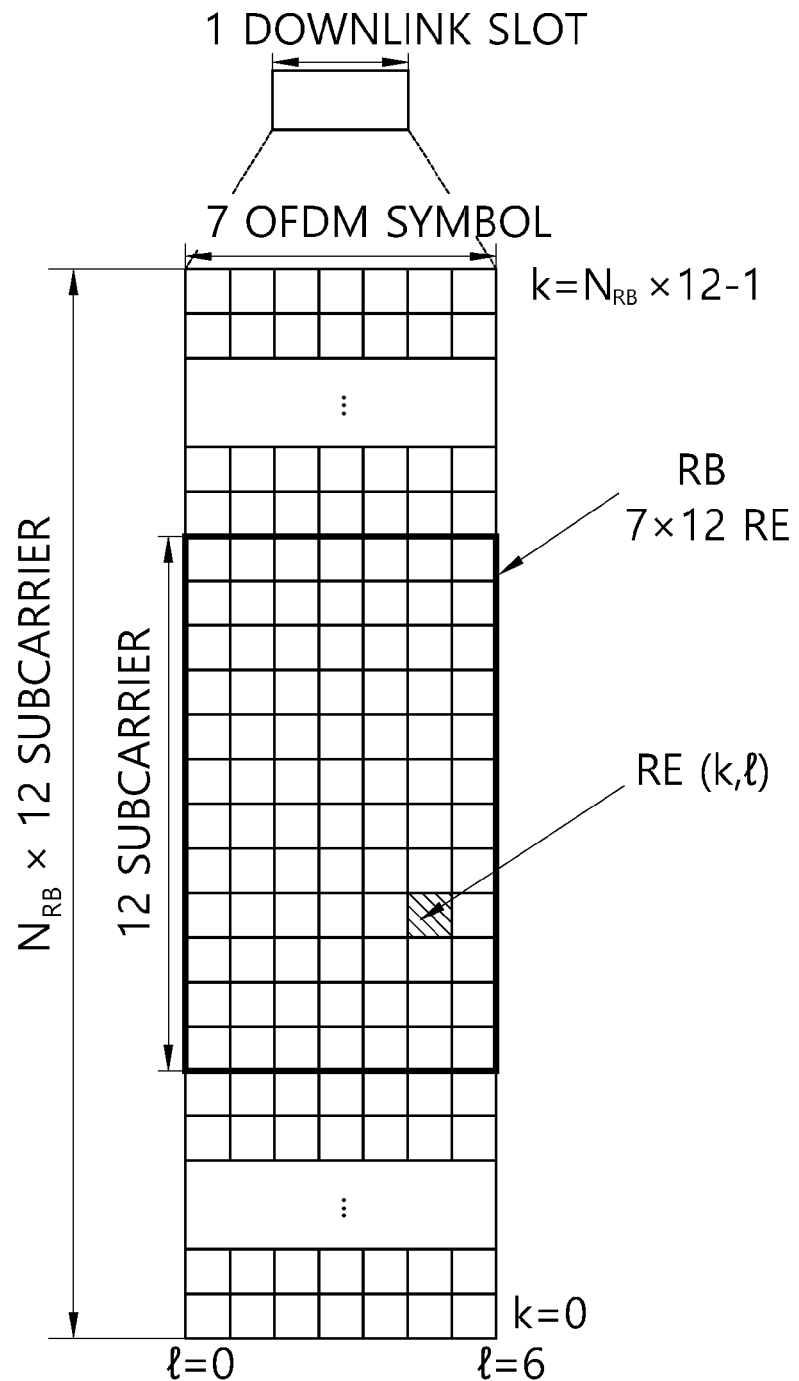

[Fig. 4]
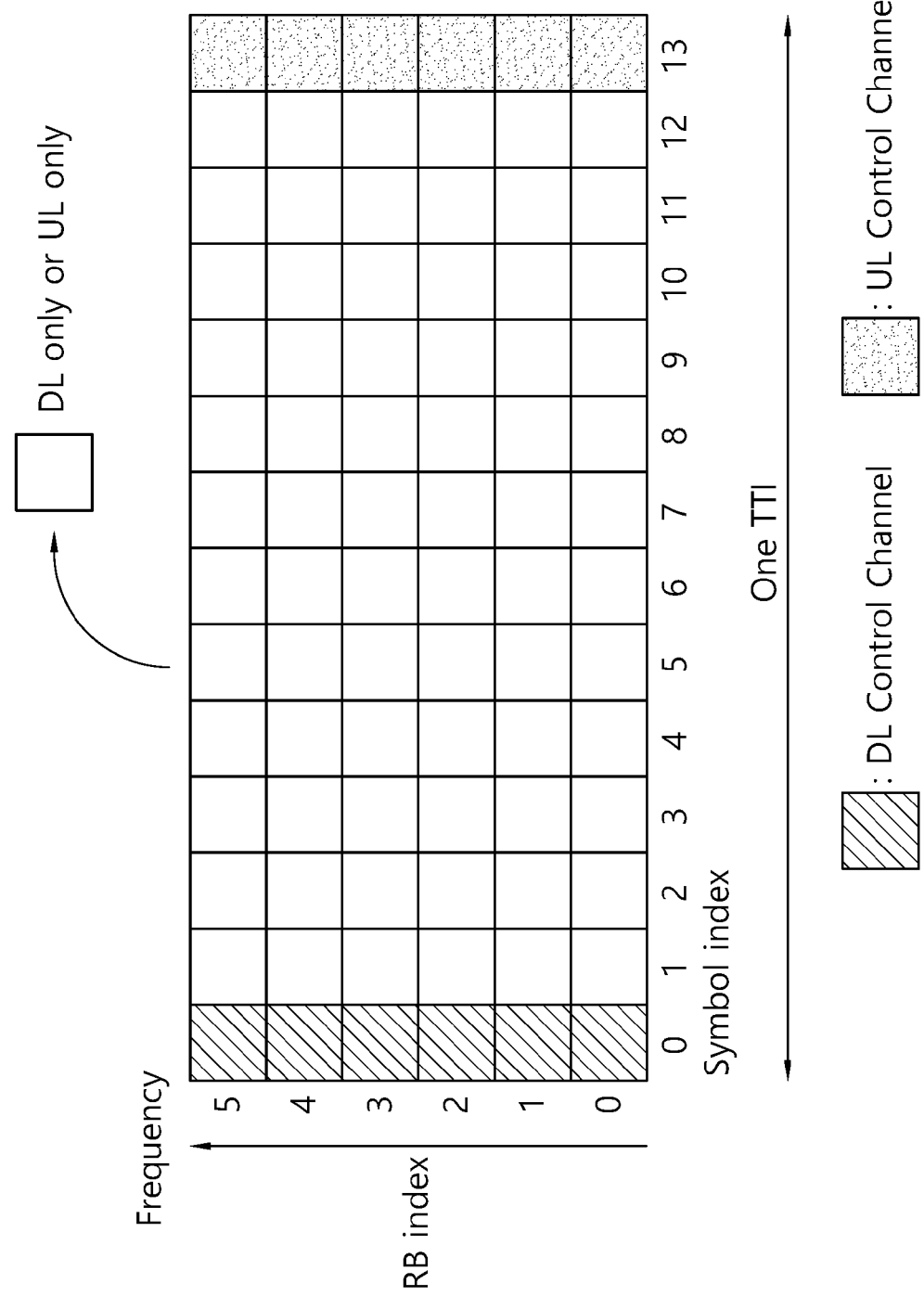

[Fig. 5]
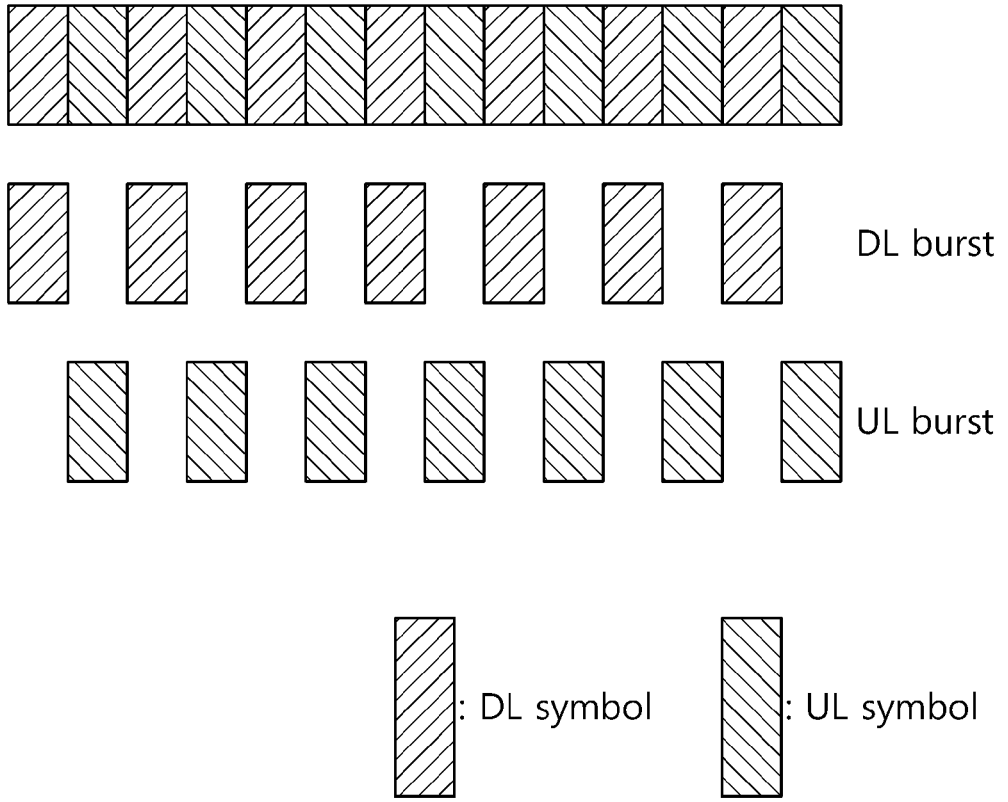
[Fig. 6]
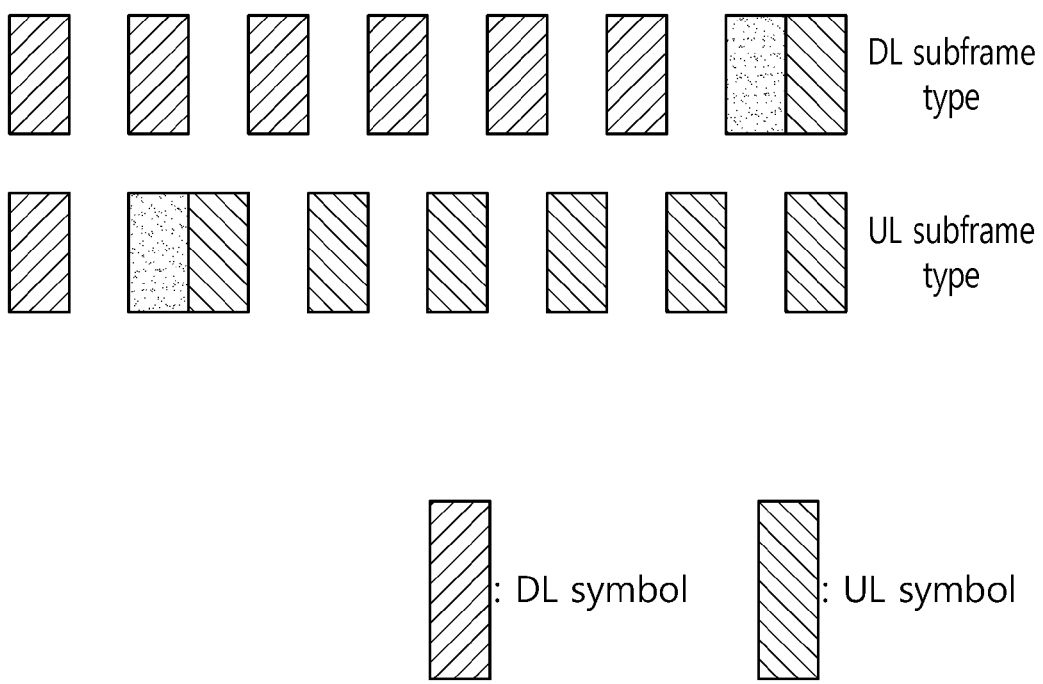

[Fig. 7]
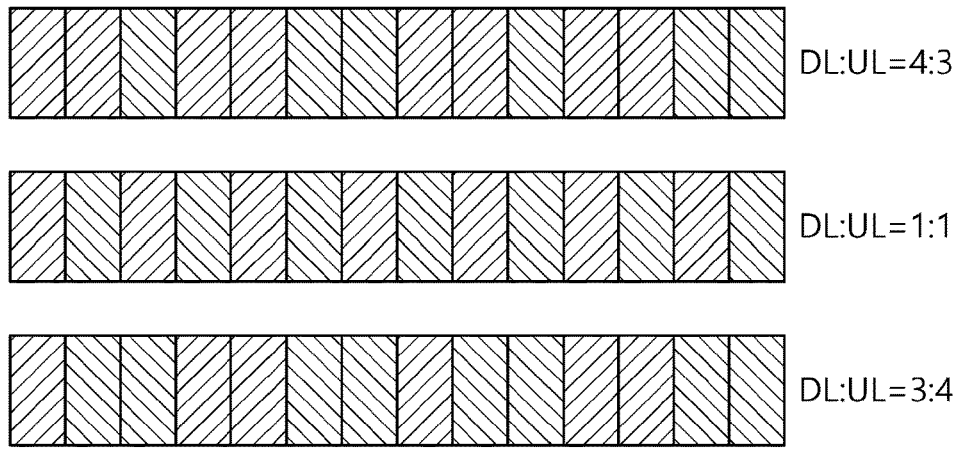
[Fig. 8]
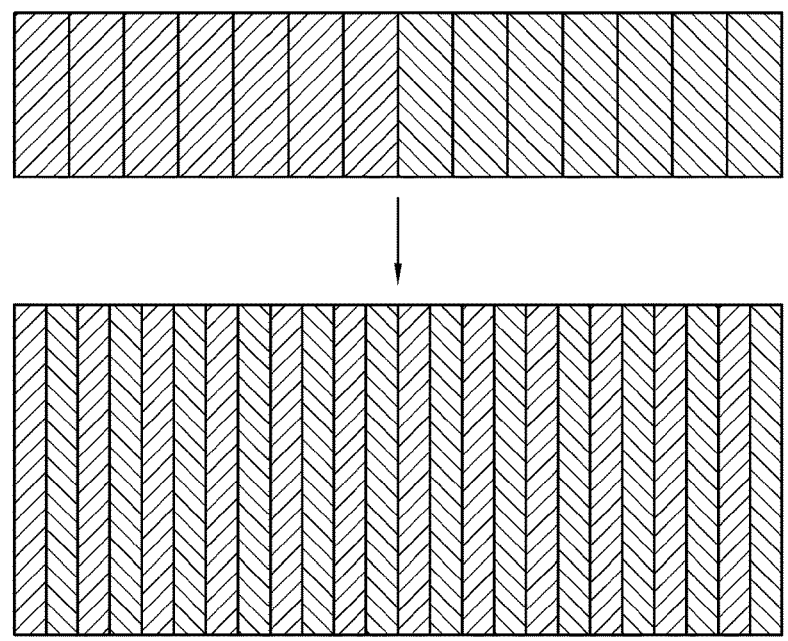
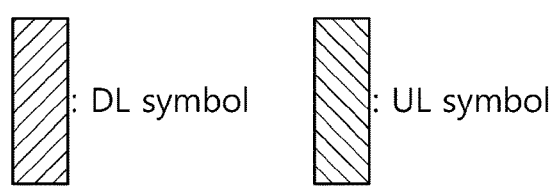

[Fig. 9]
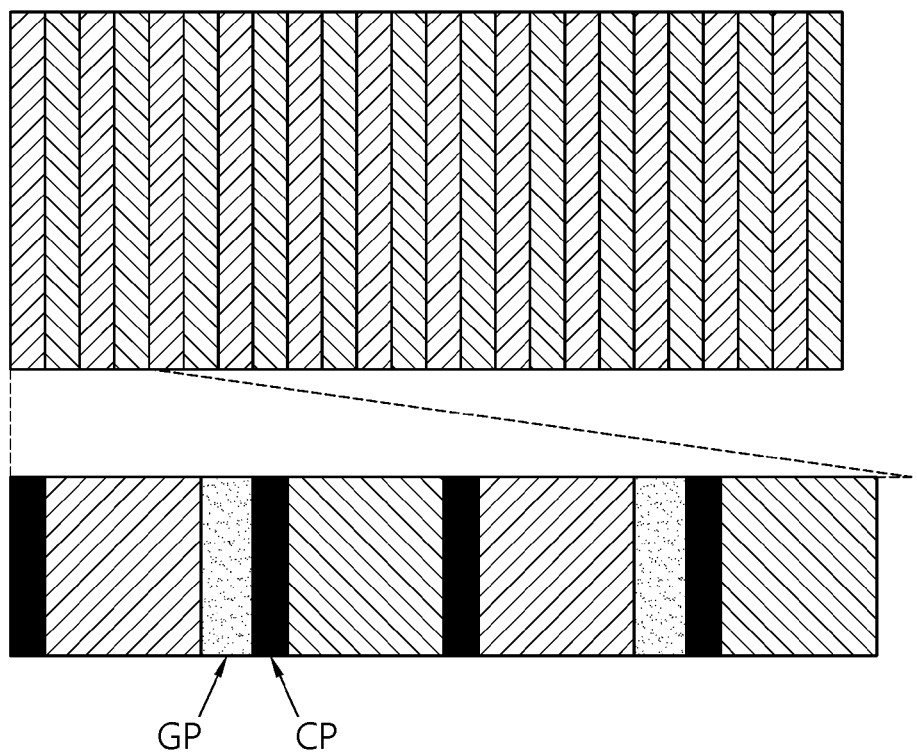
GP   CP
 : DL symbol   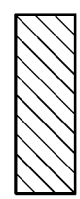 : UL symbol

[Fig. 10]
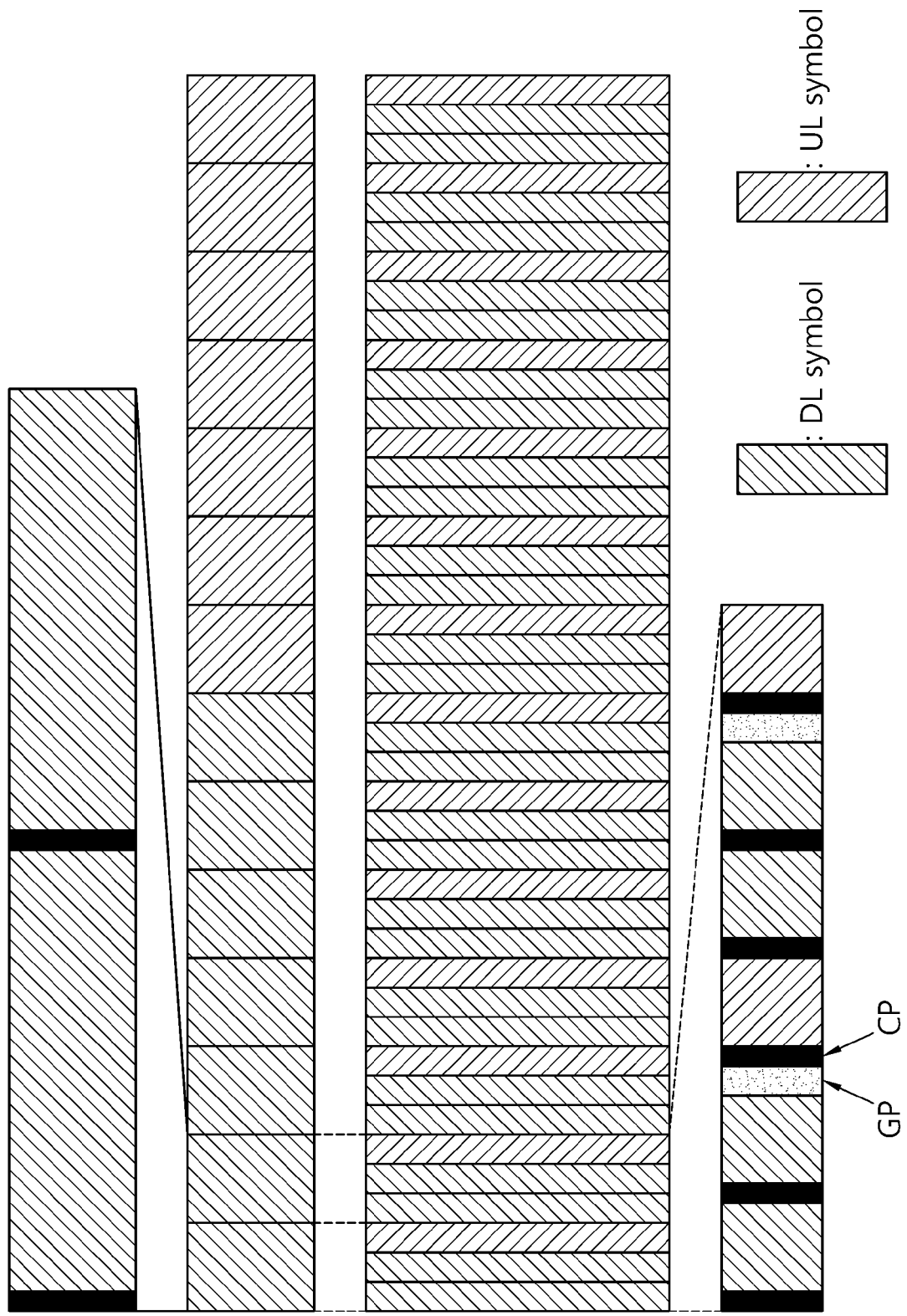

[Fig. 11]
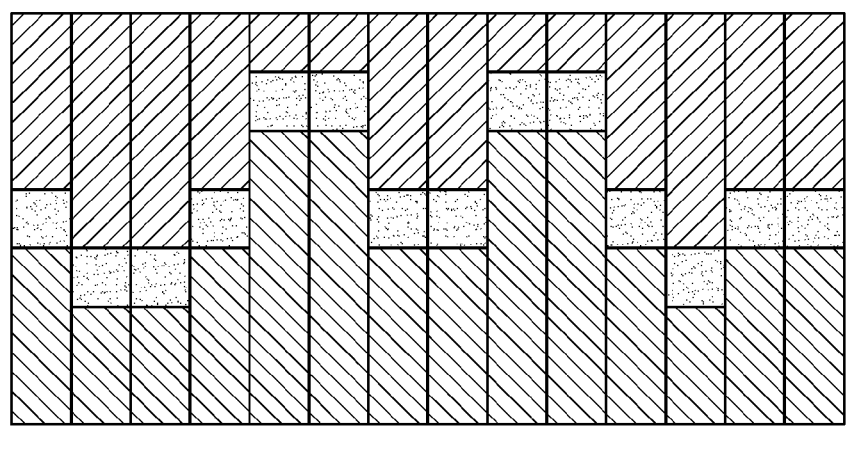

[Fig. 12]
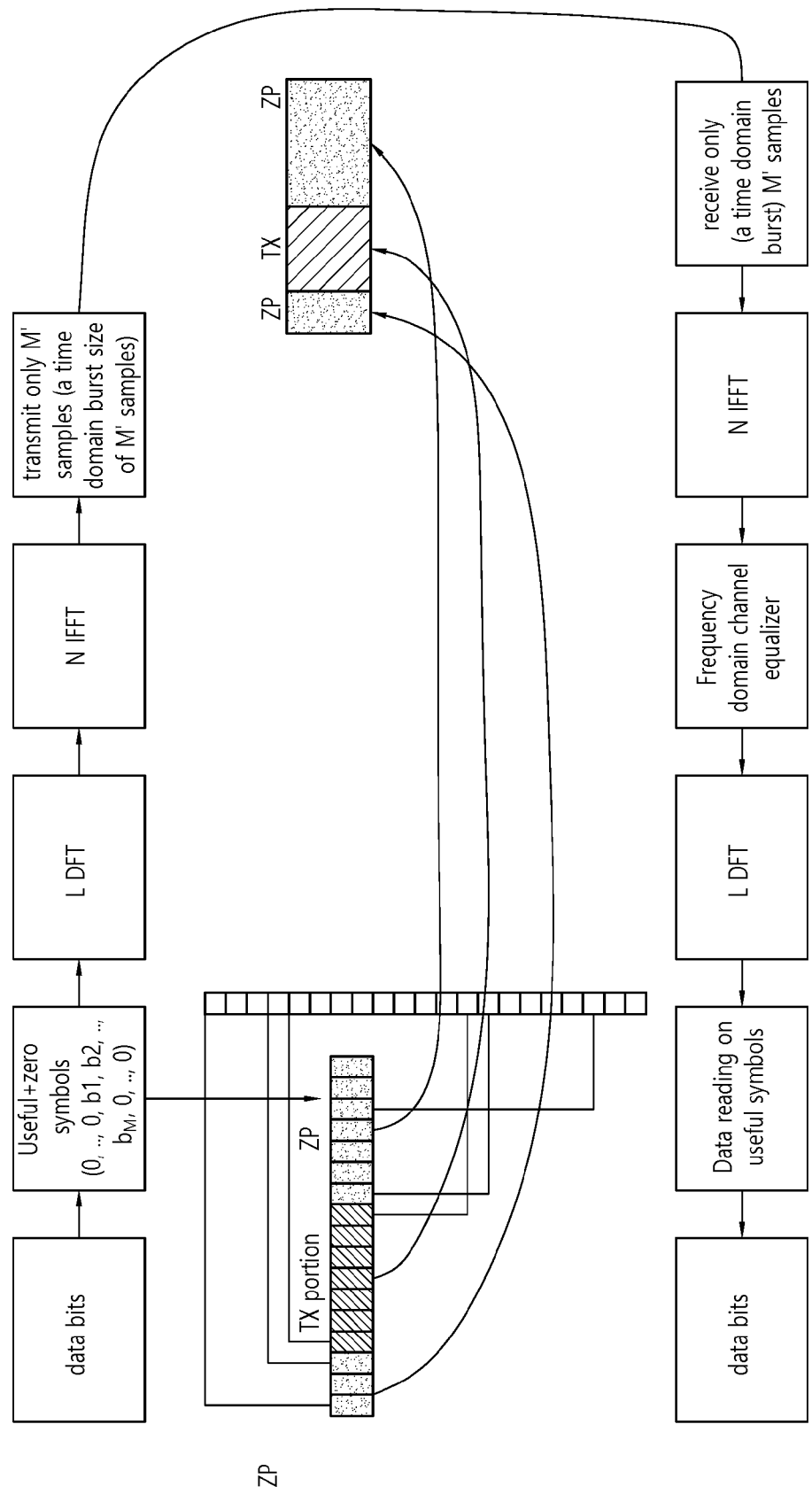

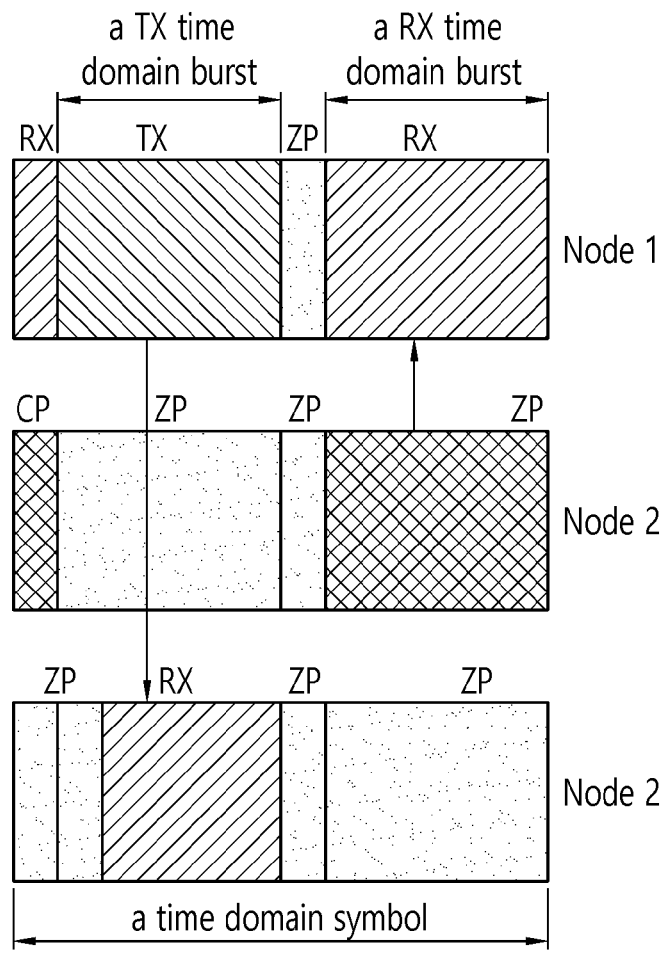
[Fig. 13]

[Fig. 14]
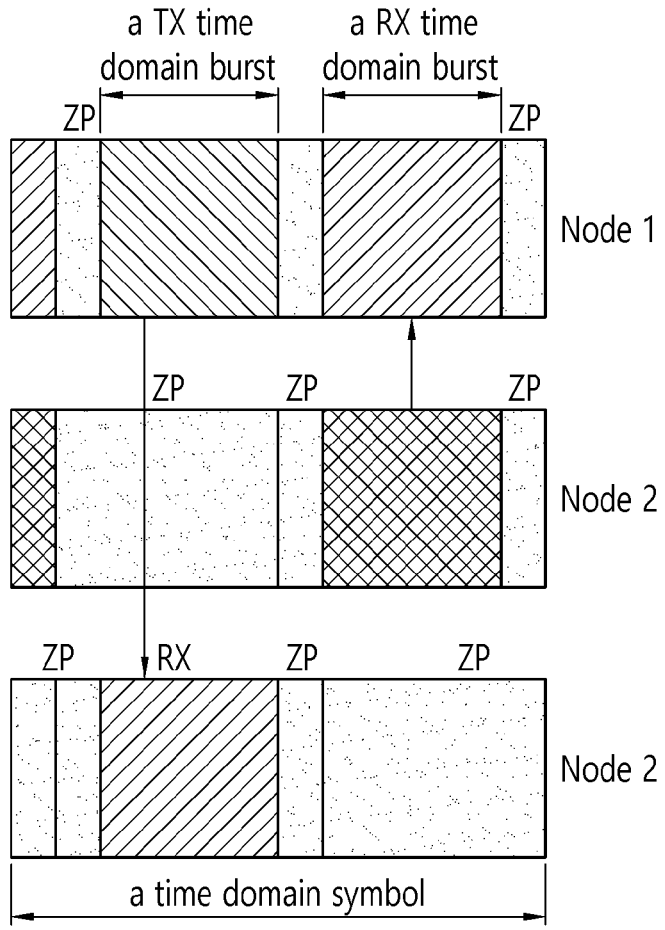
[Fig. 15]
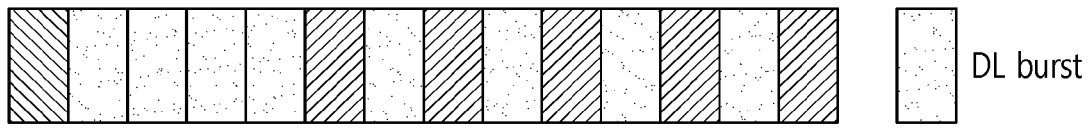

[Fig. 16]
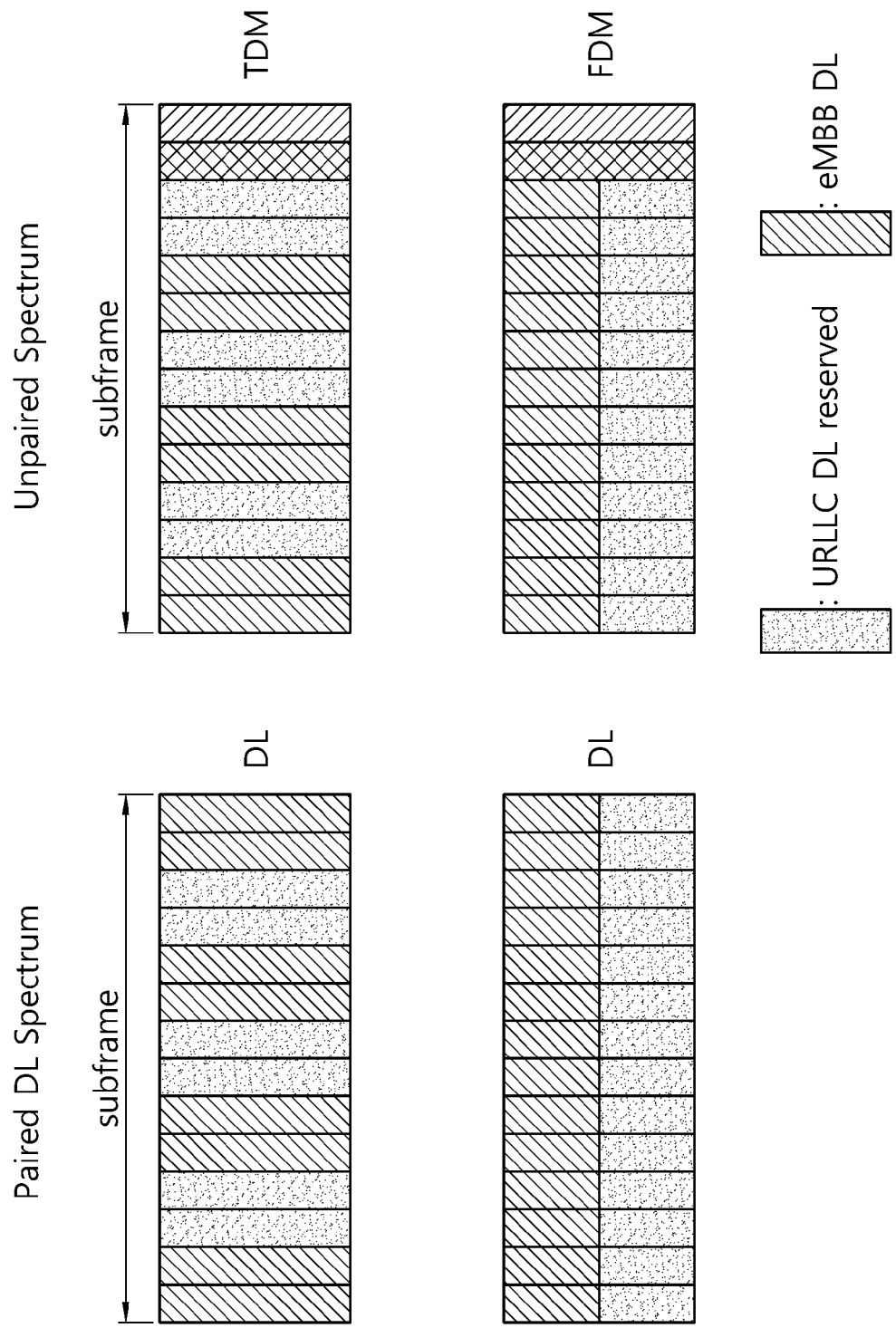

[Fig. 17]
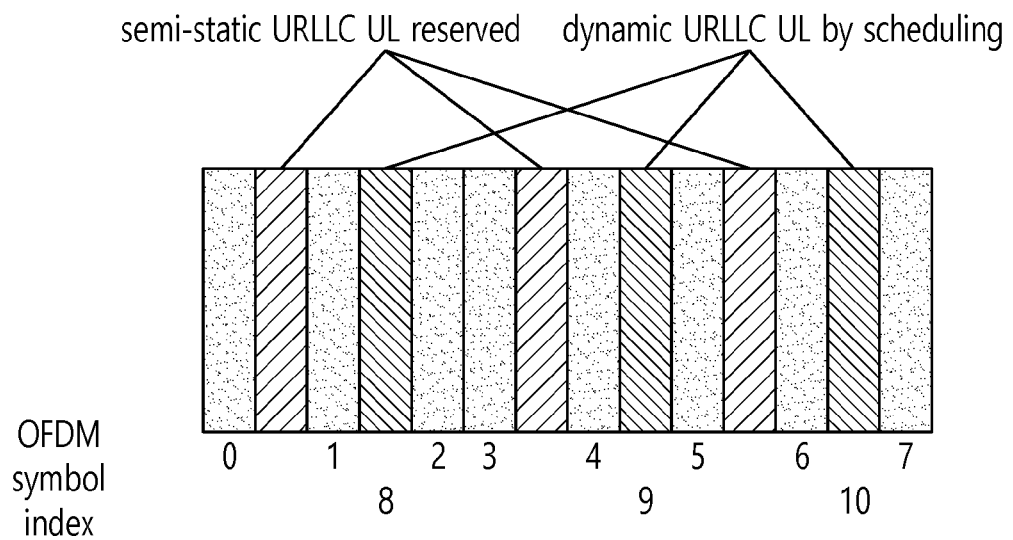

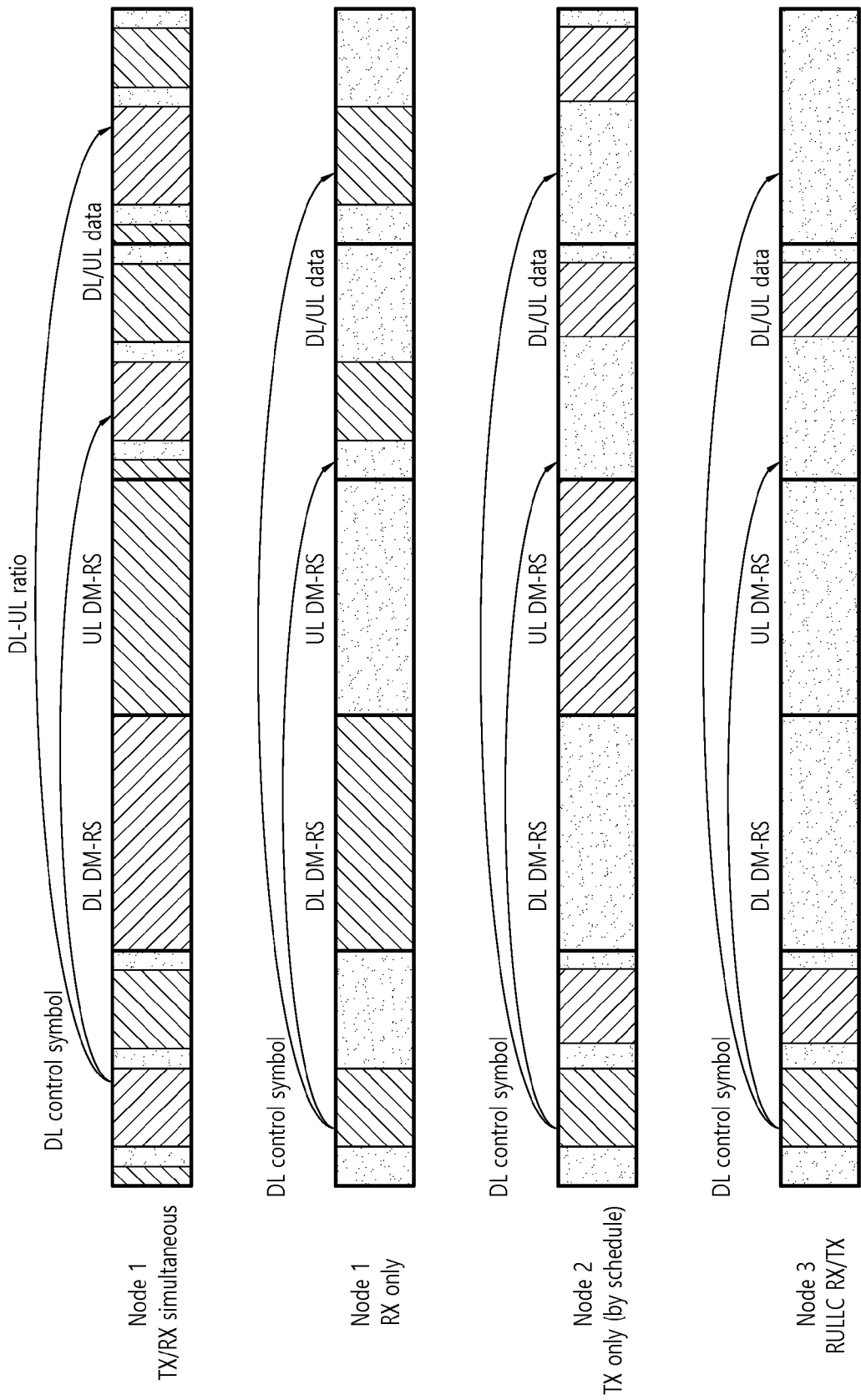
[Fig. 18]

[Fig. 19]
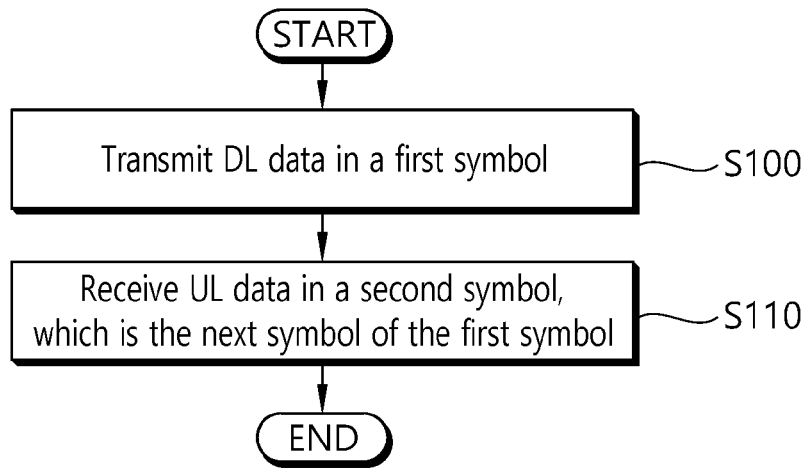
[Fig. 20]
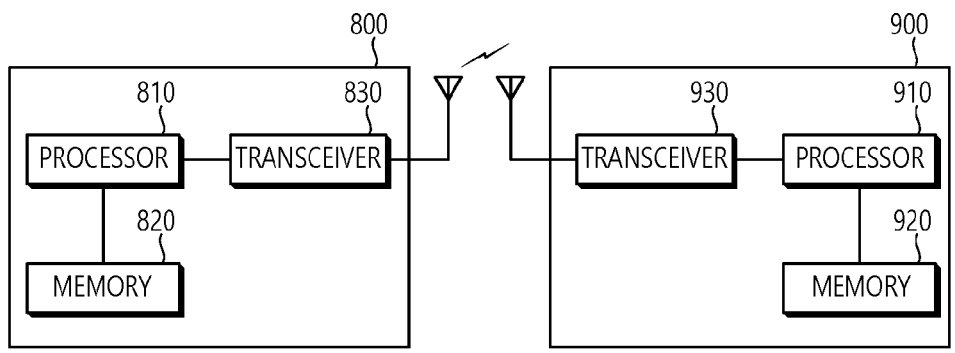

METHOD AND APPARATUS FOR SUPPORTING MECHANISMS FOR FLEXIBLE DUPLEX OPERATIONS AT SYMBOL LEVEL IN WIRELESS COMMUNICATION SYSTEM

CROSS-REFERENCE TO RELATED APPLICATIONS

This application is the National Stage filing under 35 U.S.C. 371 of International Application No. PCT/KR2017/008684, filed on Aug. 10, 2017, which claims the benefit of U.S. Provisional Application No. 62/372,868, filed on Aug. 10, 2016, the contents of which are all hereby incorporated by reference herein in their entireties.

BACKGROUND OF THE INVENTION

Field of the Invention

The present invention relates to wireless communications, and more particularly, to a method and apparatus for supporting mechanisms for flexible duplex operations at a symbol level in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (new RAT or NR) for convenience.

In NR, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating NR efficiently, various schemes have been discussed.

SUMMARY OF THE INVENTION

The present invention provides a method and apparatus for supporting mechanisms for flexible duplex operations at a symbol level in a wireless communication system. The present invention discusses how to utilize resource efficiently with paired and unpaired spectrum, particularly adapting downlink/uplink (DL/UL) portions dynamically.

In an aspect, a method for performing a fast downlink/uplink (DL/UL) switching by a network node in a wireless communication system is provided. The method includes transmitting DL data in a first symbol, and receiving UL data in a second symbol, which is the next symbol of the first symbol.

In another aspect, a network node in a wireless communication system is provided. The network node includes a memory, a transceiver, and a processor, coupled to the memory and the transceiver, that controls the transceiver to transmit downlink (DL) data in a first symbol, and controls the transceiver to receive uplink (UL) data in a second symbol, which is the next symbol of the first symbol.

Fast DL/UL switching at a (sub)-symbol level can be performed in NR.

BRIEF DESCRIPTION OF THE DRAWINGS

FIG. 1 shows a 3GPP LTE system.
FIG. 2 shows structure of a radio frame of 3GPP LTE.
FIG. 3 shows a resource grid for one downlink slot.
FIG. 4 shows an example of subframe type for NR.
FIG. 5 shows an example of DL/UL switching at a symbol level according to an embodiment of the present invention.
FIG. 6 shows an example of DL/UL switching at a symbol level according to another embodiment of the present invention.
FIG. 7 shows an example of DL/UL switching at a symbol level according to another embodiment of the present invention.
FIG. 8 shows an example of DL/UL switching at a symbol level according to another embodiment of the present invention.
FIG. 9 shows an example of DL/UL switching at a symbol level according to another embodiment of the present invention.
FIG. 10 shows an example of DL/UL switching at a symbol level according to another embodiment of the present invention.
FIG. 11 shows an example of DL/UL switching at a symbol level according to another embodiment of the present invention.

FIG. 12 shows an example of DL/UL switching at a sub-symbol level according to an embodiment of the present invention.

FIG. 13 shows an example of DL/UL switching at a sub-symbol level according to another embodiment of the present invention.

FIG. 14 shows an example of DL/UL switching at a sub-symbol level according to another embodiment of the present invention.

FIG. 15 shows an example of flexible DL/UL resource according to an embodiment of the present invention. F FIG. 16 shows an example of multiplexing of URLLC UL and eMBB DL via TDM and FDM according to an embodiment of the present invention.

FIG. 17 shows an example of multiplexing of URLLC UL and eMBB DL via TDM and FDM according to another embodiment of the present invention.

FIG. 18 shows an example of dynamic DL/UL pattern determination and location of DM-RS for each DL and UL according to an embodiment of the present invention.

FIG. 19 shows a method for performing a fast DL/UL switching by a network node according to an embodiment of the present invention.

FIG. 20 shows a wireless communication system to implement an embodiment of the present invention.

DESCRIPTION OF EXEMPLARY EMBODIMENTS

FIG. 1 shows a 3GPP LTE system. The 3rd generation partnership project (3GPP) long-term evolution (LTE) system 10 includes at least one eNodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number NDL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, 2048, 4096 and 8192 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-dvanced standards. 5G includes both new radio access technology (new RAT or NR) and LTE evolution. Hereinafter, among 5G, NR will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

It is expected that different frame structure may be necessary for NR. Particularly, different frame structure in which UL and DL may be present in every subframe or may change very frequently in the same carrier may be necessary for NR. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In NR, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in NR, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

FIG. 4 shows an example of subframe type for NR. The subframe shown in FIG. 4 may be used in TDD system of NR, in order to minimize latency of data transmission. Referring to FIG. 4, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

To be more generic, the subframe types may listed as follows in Table 1.

TABLE 1

| Configurations | Symbol index | | | | | | | | | | | | | |
| --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 |
| 0 | Dc | Dd | Dd | Dd | Dd | Dd | Dd | Dd | Dd | Dd | Dd | Dd | Dd CSI-RS | Dd CSI-RS |
| 1 | Dc | Dd | Dd | Dd | Dd | Dd | Dd | Dd | Dd | Dd | Dd | Dd | GP | Uc SRS |
| 2 | Dc | Dc | Dd | Dd | Dd | Dd | Dd | Dd | Dd | Dd | Dd | Dd | Dd CSI-RS | Dd CSI-RS |
| 3 | Dc | Dc | Dd | Dd | Dd | Dd | Dd | Dd | Dd | Dd | Dd | Dd | GP | Uc SRS |
| 4 | Dc | GP | Ud | Ud | Ud | Ud | Ud | Ud | Ud | Ud | Ud | Ud | Ud | Ud |
| 5 | Dc | GP | Ud | Ud | Ud | Ud | Ud | Ud | Ud | Ud | Ud | Ud | Ud | Uc SRS |
| 6 | Dc | GP | Ud | Ud | Ud | Ud | Ud | Ud | Ud | Ud | Ud | Ud | Ud | CSI-RS |
| 7 | Dc | GP | Ud | Ud | Ud | Ud | Ud | Ud | Ud | Ud | Ud | Ud | SRS | CSI-RS |
| 8 | Dc | GP | Ud | Ud | Ud | Ud | Ud | Ud | Ud | Ud | Ud | Ud | SRS | Uc |
| ... | | | | | | | | | | | | | | |

In Table 1, "DC" means DL control region, "UL" means UL control region, "Dd" means DL including control and data transmission, and "Ud" means UL including control and data transmission. "GP" means guard period, "CSI-RS" means a channel state information reference signal, "SRS" means a sounding reference signal. Subframe type shown in FIG. 4 may correspond to configuration 1 in Table 1.

In general, the subframe types may be represented as follows.

(1) DX . . . XU
(2) UX . . . XD
(3) UX . . . XU
(4) DX . . . XD

In other words, combination of U and/or D including control and data may form a subframe type. The subframe type may include D only subframe and/or U only subframe.

In NR, coexistence of multiple different numerologies and different requirements may be considered. This may require different needs in terms of DL and UL resources. Accordingly, very dynamic adaptation of DL and UL resource, including DL/UL resource switching at a symbol level, or even DL/UL resource switching within an OFDM or single-carrier or time-domain symbol, may be required.

In the present invention, for the convenience, time-domain symbol is used interchangeably with OFDM symbol or just a symbol, and transmission mechanism is based on single-carrier transmission. A data symbol means mean a modulation symbol for data. A demodulation reference signal (DM-RS) symbol means a modulation symbol for DM-RS. A DM-RS symbol means a symbol in which DM-RS symbols are transmitted. A data sub-symbol or DM-RS sub-symbol is used interchangeably with data symbol or DM-RS symbol.

Compared to traditional approach in which DL/UL resource switching may occur at mini-subframe level or subframe level or radio frame level, fast DL/UL resource switching may allow the following benefits.

Potentially ultra-reliable and low latency communication (URLLC) DL/UL traffic may be supported. In URLLC traffic, UL and DL transmission may occur any time. If there is no available UL resource at the occurrence, the latency may increase. Thus, supporting URLLC in TDD may be a challenging, unless there is a way to support low latency UL resources in very dynamic manner or in almost every symbol. Without allowing fast DL/UL resource switching at symbol level or very fast manner, the entire symbol may be punctured for DL transmission if URLLC UL transmission punctures DL transmission. With fast DL/UL resource switching, DL transmission may be at least partially possible even in the symbol in which URLLC UL in enhanced mobile broadband (eMBB) DL transmission occurs (or URLLC DL in eMBB UL transmission occurs). More specifically, traffic arrival for URLLC UL at the eNB may be handled immediately. Main case may be handling of URLCC UL (or URLLC traffic arrival at UE side) when eNB is not able to listen on UEs. To minimize the latency in this case, very frequent UL resources (e.g. scheduling request (SR) resource or contention based UL transmission resource) may be reserved. Reserving frequent UL resource (e.g. one or a few symbols or mini-subframes in a subframe) may impact performance of multiplexed services such as eMBB/mMTC. Thus, the reserved frequent UL resource should be minimized Once UL transmission is initiated, follow-up UL transmission (e.g. SR→physical uplink shared channel (PUSCH)→PUSCH retransmission) which may be handled by the network scheduling, may impact ongoing eMBB/mMTC transmissions. Thus, mechanism to allow fast DL/UL resource switching may be very necessary to minimize the performance degradation, in order to support partially eMBB/mMTC traffic and URLLC traffic even in the OFDM symbol.

Real-time backhaul signaling may be allowed by multiplexing transmission resource and reception resource in very short time. Since backhaul signaling negotiation may be done potentially in a very short time, possible real-time coordination among eNBs may be allowed for supporting various applications such as URLLC.

Very fast hybrid automatic repeat request acknowledgement (HARQ-ACK) may be allowed. Since symbol or sub-symbol level DL/UL resource switching may allow DL and UL opportunities in most of symbols, fast HARQ-ACK feedback and retransmission may be achieved. Even in the same subframe, more than one HARQ-ACK process may be achieved. Further, retransmission may occur within the same subframe as well with adopting proper mini-subframe or short TTI structure.

Better inter-cell interference coordination (ICIC) may be achieved. If networks are synchronized each other, alignment of DL and UL may be done better even in case of dynamic DL and UL traffic rate.

Better multiplexing between application requiring relatively long symbol transmission and application requiring short symbol transmission, which may partially collide with long symbol transmission, may be achieved. From the numerology with larger subcarrier spacing or shorter symbol length perspective, smaller subcarrier spacing or longer symbol length transmission may exist over more than a few symbols. In that sense, DL/UL resource switching at a symbol level from long symbol numerology perspective may be viewed as rather coarse granularity of DL/UL resource switching from short symbol numerology perspective. One example is that the long symbol utilizes 1.875 kHz subcarrier spacing whereas short symbol utilizes 60 kHz subcarrier spacing. In this case, there may be 32 times difference within one symbol of 1.875 kHz subcarrier spacing, and there may be 32 symbols of 60 kHz subcarrier spacing. Not able to schedule any data within 32 symbols from short symbol numerology perspective may impact overall latency considerably.

Hereinafter, details of fast DL/UL resource switching are described according to embodiments of the present invention.

1. Symbol Level Switching Via TDM Between DL and UL

To allow simultaneous DL and UL transmission, DL and UL symbols may be interlaced in a subframe/slot. By this way, DL and UL transmission can be simultaneously supported virtually. First, a case that the same numerology is kept is described.

FIG. 5 shows an example of DL/UL switching at a symbol level according to an embodiment of the present invention. Referring to FIG. 5, one symbol in every two symbols is configured for DL and UL, respectively. In FIG. 5, DL burst means a region that DL data (or TX data) may be mapped if scheduled, and UL burst means a region that UL data (or RX data) may be mapped.

From the network perspective, each symbol may have DL/UL switching time by puncturing some CP of UL symbol (i.e. the first few samples in CP of UL symbol). UL/DL switching may be handled by UE timing advance (TA). Alternatively, some portions from both DL and UL symbol may be used for DL/UL switching. Alternatively, a gap (or, GP) may be added to handle the DL/UL switching. This mechanism may work only when DL/UL switching time is small enough to be less than CP length. To compensate gap overhead, instead of normal CP, extended CP may also be used.

From the UE perspective, if TA is near to zero and UL/DL switching latency is small, the similar behavior to the network may be assumed. However, for a given UE, it is also possible that either DL subframe or UL subframe at a time can be scheduled/indicated. Accordingly, for a possible fixed DL/UL control portion, only DL symbols with UL control information (UCI) UL symbol may be used when DL subframe type is indicated dynamically or semi-statically. Similarly, only UL symbols with DL control information (DCI) DL symbol may be used when UL subframe type is indicated dynamically or semi-statically. In other words, a UE may utilize partial resources in each subframe/slot depending on slot/subframe type from the UE perspective.

FIG. 6 shows an example of DL/UL switching at a symbol level according to another embodiment of the present invention. Referring to FIG. 6, when DL subframe type is indicated, DL symbols and UL symbols carrying UCI are used. Alternatively, when UL subframe type is indicated, UL symbols and DL symbols carrying DCI are used.

FIG. 7 shows an example of DL/UL switching at a symbol level according to another embodiment of the present invention. Referring to FIG. 7, the ratio between DL symbols and UL symbols may be differently configured. 1:1 ratio may be default. FIG. 7 shows an example of ratio between DL symbols and UL symbols when subframe consists of 14 symbols.

Further, any combination between DL symbols and UL symbols may also be supported. If extended CP or 12 symbols in a subframe is used, ratio of 1:1, 2:1 (UL symbol may exist in every 3rd symbol), 3:1, and so on, may be considered for the ratio between DL symbols and UL symbols. Further, a subframe length with symbol level TDM may be increased compared to regular frame structure (e.g. twice) to retain the same number of symbols in each DL and UL burst.

Second, a case that different numerologies are used is described. For example, if numerology with reference subcarrier spacing (hereinafter, SC0) with normal CP is necessary for an unpaired spectrum, to allow virtually simultaneous DL and UL transmission, numerology with SC0*2 (or SC0*) with extended CP may be considered. In numerology with SC0*2, DL portion may consist of e.g. every even symbols whereas UL portion may consist of every odd symbols. Further, different numerologies may be used between DL and UL. For example, the numerology for DL may be kept as SC0, whereas the numerology for UL may be changed to SC0*2 with normal CP or extended CP. One symbol or CP portion may be used for DL-UL switching and necessary gap.

FIG. 8 shows an example of DL/UL switching at a symbol level according to another embodiment of the present invention. Referring to FIG. 8, for numerology with SC0*2, DL portion consists of every even symbols (symbol index 0, 2, 4 . . . ), and UL portion consists of every odd symbols (symbol index 1, 3, 5 . . . ). In this embodiment, DL portion may consist of only DL symbols which may not be continuous in time, and the number of symbols for a DL portion within a subframe may be smaller than the number of symbols in a subframe.

If it is necessary to have DL/UL switching, the gap may be created by reducing CP length for UL symbol. For example, if SC0=15 kHz, by using SC0*2=30 kHz with extended CP, the CP length may become about 8us and some portion of CP may be used for DL/UL switching. DL/UL switching gap nay be added in every subframe where switching is necessary. Alternatively, the CP in each symbol may be reduced and the gap between DL symbol and UL symbol may be created.

FIG. 9 shows an example of DL/UL switching at a symbol level according to another embodiment of the present invention. Referring to FIG. 9, the CP in each symbol is reduced and the gap between is created between DL symbol and UL symbol.

Different numerologies may be used between DL and UL. For example, 30 kHz subcarrier spacing may be used for DL, whereas 60 kHz subcarrier spacing may be used for UL. Alternatively, the numerology may be fixed for DL and UL, though, the actual usage of numerology in each DL or UL may be based on different numerology. Also, it is possible that different channel may be based on different subframe structure. For example, when a UE is scheduled with DL data or UL data, the subframe structure based on SC0 (contiguous DL/UL burst) may be used, whereas HARQ-ACK transmission may utilize the subframe structure based on SC0*4 (i.e. different numerology). Or, the type in each symbol may be dynamically indicated by the scheduling.

If SC0*4 with extended CP is used, the formation of a subframe may have the following two options:
(1) 48 symbols with extended CP: In this option, symbol level alignment between SC0 with normal CP subframe and SC0*4 with extended CP may not be achieved.
(2) 42 symbols with extended CP: This option is to place 3 symbols with SC0*4 and larger CP in every 1 symbol of SC0 with normal CP. This may allow symbol level alignment between two numerologies, and may also allow dynamic switching between SC0 with normal CP and multiple symbols of SC0*4 with extended CP in every symbol.

If option (1) is used, the ratio between DL symbol and UL symbol may be one of 3:1 or 1:2 or 2:2 or 4:0 or 0:4 in every 4 symbols. Alternatively, this may be viewed as placing a mini-subframe of DL/UL in every symbol with SC0 with normal CP numerology by utilizing larger subcarrier spacing with extended CP. If option (2) is used, the ratio between DL symbol and UL symbol may be 2:1 or 1:2 or 3:0 or 0:3. Either (1) or (2) is used, as the extended CP or larger CP may not be necessary, the CP length equal to SC0 with normal CP may be used regardless of subcarrier spacing, and the remaining time portions may be used for gap.

FIG. 10 shows an example of DL/UL switching at a symbol level according to another embodiment of the present invention. Referring to FIG. 10, the ratio between DL symbol and UL symbol is 2:1

If option (2) is used, DL/UL ratio may be configured based on symbol of SC0. The configuration may include one of SC0 DL, SC0 UL, SC0*4 DL:UL ratio 2:1, SC0*4 DL:UL ratio 1:2, SC0*4 DL, SC0*4 UL. Similar mechanism may also applicable to option (1). In other words, dynamic indication of subcarrier spacing or symbol construction may be also indicated and dynamic indication may still work based on SC0 numerology. Further, the first symbol may utilize the base numerology or with fixed DL/UL ratio. Alternatively, assuming every symbol can be dynamically switched to UL from DL (or from DL to UL), gap may be inserted in every symbol with SC0*4 or SC0*2. In other words, from a UE perspective, continuous DL symbols may be expected, and a network may switch one or a few symbols to UL symbols to handle URLLC traffic dynamically.

The gap created by shortening CPs may be used for DL/UL switching and TA and possibly power transient period. From UL to DL, by timing advance (e.g. TA offset of 3 us for DL/UL switching), DL/UL switching time may be addressed. In case 30 kHz subcarrier spacing, the CP length may be about 4 us for each symbol, and gap length may be about 8us. If a UE cannot perform this fast switching between DL/UL, or timing advance is not near to zero which requires more gap, the following approaches may be considered.

- It may not be expected that DL and UL occur in the adjacent symbols. In other words, a UE may have sufficient time for DL/UL switching and timing advance.
- It may not be expected that DL and UL occur in the same subframe. However, DL control and UL control may still be scheduled to the same subframe, whereas DL data and UL data transmission may not occur in the same subframe.
- Some puncturing or not receiving DL samples may be allowed for sufficient gap.

2. Symbol Level Switching Via FDM Between DL and UL

Another approach of dynamic resource allocation between DL and UL is to partition DL and UL frequency portions in each symbol dynamically. This may be simply done by allocating different DL/UL frequency region in each symbol by either dynamic or semi-static configuration. Or, this may be done by following a pattern. Candidate patterns may be semi-statically configured and the exact pattern may be indicated dynamically per each symbol.

This approach is to divide frequency between DL and UL in symbol or every a few symbols (i.e. symbol group). The symbol group may be as large as one subframe or one slot. If FDM is used more than one subframe, it may also be applied over subframe group.

FIG. 11 shows an example of DL/UL switching at a symbol level according to another embodiment of the present invention. Referring to FIG. 11, each symbol consists of DL frequency portion and UL frequency portion. Further, each symbol includes a guard band between the DL frequency portion and the UL frequency portion. This approach may require the capability of the network or UE to receive and transmit simultaneously in different frequency with flexible transmission bandwidth. To mitigate the interference (self-interference) from its own transmission on reception, it may be also considered to have guard band between transmission and reception bandwidth.

If transmission timing is not aligned with reception timing due to timing advance, etc., it may be needed to consider a gap in each symbol to absorb TA, at least in case transmission bandwidth and reception bandwidth is changed. Some portions from CP in either symbol (before or after) or some portions from both symbols (before or after) may be used for the gap. If DL/UL FDM portion changes in a symbol group or subframe or subframe group, the gap may be inserted in the beginning of every symbol group or subframe or subframe group. Furthermore, a few symbols may be dedicated to either DL or UL to transmit DL control and/or DM-RS transmission, which needs to be transmitted over the entire bandwidth where data can be scheduled. Alternatively, control may also be punctured or rate matched based on configuration of DL/UL portion in each symbol, and RS transmission may be restricted to either DL or UL (depending on RS transmission for DL or UL). Additional RS may be transmitted in different time/frequency location once the first set of RS is not sufficient.

If a UE does not support simultaneous TX/RX capability, the UE may be scheduled with either DL or UL at one symbol. However, this implies that the frequency region of control and/or data may be mapped differently in each symbol. Also, from such a UE perspective, the gap may be inserted between DL and UL transition in time to absorb switching time and TA.

3. Sub-Symbol Level Switching Via Between DL and UL

Another approach of fast DL/UL switching is to consider sub-symbol level via TDM between DL and UL transmissions. Compared to the previous symbol level switching via FDM, which may require additional hardware (e.g. flexible duplexer) and potentially interference cancellation capability, this approach may allow DL/UL multiplexing in a time-domain symbol without addition of high complexity. Hereinafter, TX portion from a node perspective may be called as a TX time-domain burst and RX portion may be called as a RX time-domain burst. TDM may be achieved in a time-domain symbol, or in a symbol group or in a subframe. In this case, as the signal generation is per time-domain symbol, this means that the same TDM pattern may be used over a symbol group or a subframe, etc. This approach may provide better flexibility as the duration change between DL and UL may be dynamically adapted without fixed overhead necessary to address possible switching and TA gap. Furthermore, this may address potential issue with symbol-level FDM between DL and UL.

FIG. 12 shows an example of DL/UL switching at a sub-symbol level according to an embodiment of the present invention. Referring to FIG. 12, M represents the number of data symbols which will be transmitted with non-zero power, and M' represents the number of samples in time domain. M' may be computed as roughly $M'=N/L*M$. M may be defined by the ratio of TX portion compared to the time-domain symbol duration T as $M=L*TX$ ratio (i.e. TX portion length/a time domain symbol duration T). By transmitting M symbols out of possibly L symbols with non-zero power, it means that non-zero power samples will be transmitted for roughly $M/L*T$, where T is the duration of a time-domain symbol. For example, if T=1 ms, and transmission window may expected to be 0.5 ms, then M may be roughly $0.5*L$, where L may be the number of subcarriers in the transmission system bandwidth. The overall procedure is applied to any value pairs of N and L ($L<=N$).

As shown FIG. 12, the idea is to generate useful or non-zero symbols with zero (or null) symbols, which will be transmitted with zero-power (or not transmitted) in time-domain after inverse fast Fourier transform (IFFT) processing. The total number of generated symbols including useful and null symbols may be equivalent to the system bandwidth's subcarrier spacing number. To multiplex DL portion and UL portion within a time-domain symbol, the output signal may be expected to have non-zero power in DL portion and zero-power in UL portion from the transmitter perspective. In the receiver perspective, receiver needs to take only partial samples as valid input samples (i.e. RX portion) which corresponds to samples transmitted with non-zero power over TX portion of the intended transmitter. The desired samples/symbols at the output signals may be "useful samples/symbols over TX portion, null samples/symbols over non-TX portion". To create partial useful samples/symbols, the input symbols to discrete Fourier transform (DFT) may form useful and null symbols. Through DFT, both useful/null symbols may be spread over the entire transmission system bandwidth. After that, N IFFT may be performed where N is generally equal to or greater than L. After N IFFT, time-domain signals may be equivalent to a pulse-shaped and oversampled version of original input symbols which include both useful and null symbols. Samples corresponding to useful symbols may be transmitted with non-zero power. Samples corresponding to null symbols may be omitted or zero-power transmission may be assumed.

In the receiver side, the reverse operation may be achieved to extract the data. The receiver may take samples from only non-zero power portion of TX portion and process samples in other region/portion as null signals. Thus, the input to FFT may include only samples corresponding to useful symbols of the transmitter. After FFT, through frequency domain equalization (for better efficiency and lower complexity), the samples may be processed and mapped to frequency domain, which are converted back to useful symbols via inverse DFT (IDFT).

FIG. 13 shows an example of DL/UL switching at a sub-symbol level according to another embodiment of the present invention. Referring to FIG. 13, TDM operation may be done by each node. Alternatively, either partial DL or partial UL may done by each node, which may be dependent on the capability of UE or the value of TA, etc.

One example to allow TDM between DL and UL is that the transmitter/receiver uses the following sequences in one symbol respectively.

DL: ZP-DL-ZP-ZP
UL: CP-ZP-ZP-UL

In DL, the transmitter transmit samples/symbols in time domain, and treat other samples with zero power transmission. In ZP which corresponds to intended transmitter's (UL node) TX portion, the transmitter may receive samples/symbols. Similarly for UL transmitter, only samples corresponding to UL portion may be transmitted.

From a node receiving partial samples perspective, a gap may be required before and after receiving samples. At least before receiving data, switching time from TX to RX may be necessary. And after receiving data, switching time from RX to TX may be necessary. Further, from a node transmitting partial samples perspective, a gap may also be required before and after transmitting samples. Before transmission, a gap may be required for TA and RX-TX switching (which may be overlapped with RX part) and for reducing interference to other transmissions. After transmission, a gap may be required for reducing interference to the next transmission (by different node) and TX-RX switching (which may be overlapped with RX part).

FIG. 14 shows an example of DL/UL switching at a sub-symbol level according to another embodiment of the present invention. Referring to FIG. 14, more detailed time portions where the UE can transmit or receive are shown, compared to the embodiment shown in FIG. 13. In summary, the gap before/after transmission should be able to capture the followings. But, the actual gap may vary depending on the cases.

necessary gap to minimize interference from its own transmission to reception (or other transmission from other node)
necessary gap to allow DL-UL switching (or TX-RX switching)
necessary gap to absorb timing advance value This approach may dynamically change the zero-power portion. Zero-power portion may or may not exist. For example, if there is only DL transmission from the network, the structure may be CP-DL, and zero-power portion(s) may not exist. If there is only UL transmission towards the network, the structure may be ZP-ZP for receiver and CP-UL for transmitter. The network may listen only in such a symbol.

Further, different type of DL/UL partitioning may be possible as follows.

ZP-DL-ZP-UL-ZP=DL: ZP-DL-ZP-ZP-ZP & UL: ZP-ZP-ZP-UL-ZP
CP-ZP-DL-ZP-UL-ZP=DL: ZP-ZP-DL-ZP-ZP-ZP & UL: CP-ZP-ZP-ZP-UL-ZP.

One of the benefit of DL/UL switching at sub-symbol level is flexibility to adapt DL and UL resources. Any different ratio between DL and UL may be adapted based on the ratio between useful symbols and null symbols before DFT processing (i.e. data generation part). For example, eMBB DL with 15 kHz subcarrier spacing and URLLC UL with 60 kHz subcarrier spacing may be multiplexed, where only one UL is necessary to handle, e.g. HARQ-ACK transmission. Then, the ratio between the number of useful symbols M and the number of null symbols (L-M) may be roughly 3:1 (though considering necessary zero-power requirements, the actual symbol duration/number M may be reduced). To support this type of multiplexing without the DL/UL switching at sub-symbol level, the entire symbol may be punctured or not be usable for eMBB transmission or DL/UL switching at symbol level via TDM) needs to be used in symbols. As this mechanism is more appropriate with single-carrier transmission, higher frequency (mm-Wave) such as 40 GHz or backhaul signaling or sidelink operations may be more attractive with this approach. Also, it may be more effective when TA becomes near to zero (and thus overhead of DL-UL switching can be minimized) and the symbol length between DL and UL is quite different (and thus, puncturing one entire DL time-domain symbol for UL or UL time-domain symbol for DL becomes efficient), such as multiplexing between multimedia broadcast multicast services (MBMS) and unicast or mMTC and URLLC.

In terms of scheduling from a UE perspective, the following approaches may possible for a given UE.

Either DL or UL may always be scheduled: Assuming without full duplex capability, a UE may be scheduled either DL or UL. If the same position of base DM-RS is used for DL and UL (e.g. 3rd symbol), DM-RS in the same symbol may need to be shared between DL and UL via such as partial sample transmission. To allow full time-domain symbol transmission for RS, the location of UL and DL DM-RS position may be different (e.g. 3rd symbol for DL DM-RS, and 4th symbol for UL DM-RS).

A UE may be scheduled either one or both of DL and UL: Assuming that a UE can support DL and UL simultaneously within a subframe, both may also be scheduled in a subframe. In this case, similar to the above, DM-RS position may be shared or separate between DL and UL.

4. DL/UL Configuration

Regardless of which technique is used for DL/UL switching, it may be necessary to allow dynamic configuration of DL/UL ratio in each unit where DL/UL resource can change. For example, one unit may be two symbols for DL/UL switching via TDM at symbol level, or may be one symbol for DL/UL switching via FDM at symbol level or DL/UL switching via TDM at sub-symbol level. In terms of configuration, there may be multiple patterns of DL and UL ratio (including all DL or all UL) and one of the pattern may be indicated. One of the followings may be considered.

Semi-static configuration: DL:UL ratio of each unit may be semi-statically configured, though each unit can have different pattern. For example, if semi-static URLLC data traffic is expected, semi-static DL/UL ratio may be considered. Semi-static configuration on a subset of symbols or a subset of (mini-)subframes may also be considered.

Dynamic configuration at mini-subframe or subframe level or subframe group level: The pattern of each unit may be indicated in every subframe or subframe group or mini-subframe. When scheduling a data, the pattern of DL/UL in each unit may also be indicated dynamically. However, this implies that DL/UL pattern of symbol(s) where control channel carrying this information should be rather semi-statically configured or prefixed. Also, symbol which may be required for control channel decoding to determine DL/UL pattern change information may also be required to be semi-statically configured or the pattern of the symbol may be known (e.g. the new pattern will not be applied to the symbol). For example, for DL/UL switching via TDM at symbol level, the first two symbols may always be used with DL or the first one symbol may always be used with DL for DL control.

Flexible DL/UL pattern in each unit: Though it leads somewhat high overhead, the ratio of DL/UL in each unit may be signaled via some signaling mechanism. As the signal may be transmitted only in symbols where the pattern is known, the signaling may present prior to the symbol where the pattern will be applied (i.e. before symbol to apply a new DL/UL pattern).

Implicit DL/UL pattern in each unit: Based on scheduling, the pattern may be implicitly determined and the pattern may be changed at the transmitter side depending on packet arrival (e.g. create UL portion for a new UE's UL transmission without explicit indication to the current receiver of on-going DL transmission).

If this mechanism is used between eNBs for backhaul or UEs for sidelink, either semi-static configuration may be used, or there may be a master node which will determine the DL/UL ratio and then transmit the DL/UL pattern dynamically via control channel or signal.

FIG. 15 shows an example of flexible DL/UL resource according to an embodiment of the present invention. FIG. 15 assumes a DL/UL switching via TDM at a symbol level. To allow flexible resource allocation of DL burst/UL burst, another variation of this approach is to index symbol in different way. More specifically, symbol index may increase by 0-7-1-8-2-9-3-10-4-11-5-12-6-13.

To allow UCI portion and possible gap before UL burst for DL subframe type, one symbol may be punctured or rate matched before UL transmission, regardless of DL burst indication in case of UCI transmission in the last symbol or in any symbols. Alternatively, the symbol before UCI transmission for DL burst configuration may have the second last symbol index in a subframe and the second last symbol index in a subframe for UL burst (i.e. 0-6-1-7-2-8-3-9-4-10-5-11-12-13 for DL burst and 13-12-6-0-7-1-8-2-9-3-10-4-11-5).

The idea is to configure DL or UL symbol in each symbol by DL burst or UL burst configuration dynamically or semi-statically. Data may be mapped to following frequency first and time second in absolute time order or based on symbol index. If the mapping is done based on symbol index, the data may be mapped to interlaced symbols for either DL or UL first, and then UL or DL symbol which are dynamically changed to DL or UL symbol. Similarly, in case of time-first and frequency-second mapping, the same approach may be applied.

The idea is to schedule data which may be mapped to static or fixed DL or UL (for PDSCH or PUSCH respectively), and then if interlaced UL or DL has not been used, repetition may occur by utilizing unused resources. Alternatively, a UE may be scheduled with two candidates of PDSCH. The first candidate is to schedule PDSCH only via fixed DL resources. The second candidate is to schedule PDSCH via fixed DL resources and unused UL resources, which are used by DL transmission. The indication may be done by two-level DCI. The second level DCI may indicate additional mapping of unused UL resources over any fixed DL resources (i.e. data region). Alternatively, the network may indicate the number or the last code block (CB) index which has been transmitted before the next or following slot/subframe. In this case, a UE may assume that data is scheduled over fixed DL resources and UL resources as well and actual transmission may not occur in the used UL resources. The used UL resources may be indicated instead of last CB index so that a UE can assume that DL transmission is punctured in the used UL resources.

Furthermore, this technique may be applied when different numerologies are used without loss of generality, where symbol index is increased in DL portion first and UL portion second for DL index, and vice versa for UL index.

FIG. 16 shows an example of multiplexing of URLLC UL and eMBB DL via TDM and FDM according to an embodiment of the present invention. To handle URLLC UL, with or without DL/UL switching via TDM/FDM at a symbol level, simple TDM and FDM between URLLC UL and eMBB DL burst may be considered. In the reserved UL resource, the network may listen on any possible URLLC UL transmission including SR or contention based resource or general URLLC UL. In this case, eMBB DL data may be mapped in consideration of semi-static URLLC UL resources. As reserving URLLC UL resource semi-statically leads inefficient resource usage, some better mechanisms of handling dynamic adaptation of URLLC UL portions may be considered by treating semi-static and dynamic URLLC UL resource differently. For example, SR resource or contention based resource which are configured semi-statically may not be used for eMBB DL transmission. For other potential URLLC UL resource for handling dynamic URLLC traffic via scheduling, it may be handled by the network.

FIG. 17 shows an example of multiplexing of URLLC UL and eMBB DL via TDM and FDM according to another embodiment of the present invention. Referring to FIG. 17, semi-static URLLC UL resource may not be used for any DL data mapping, whereas dynamic UL resource may be used for DL data mapping, though the data may be mapped to non-URLLC UL possible symbols first and then to URLLC UL possible symbols second to possibly protect system bits. This may be done by allocating symbol index differently shown in FIG. 17. The DL data may be mapped following the symbol index.

In this embodiment, UCI portion and necessary gap may be semi-static UL resource so that symbol index for DL burst will not be mapped to such symbols. Further, this embodiment shows the symbol index for DL burst. For UL burst, different indexing may be used. For example, symbol may be indexed by 0-13 from the beginning (as UL can be punctured by the network for DL transmission).

When DL/UL switching via at a sub-symbol level is used, an example of resource allocation to handle eMBB and URLLC multiplexing is as follows.

(1) For SR or contention-based UL resource, semi-static DL:UL (e.g. DL:UL=1:1) time-domain symbol(s) may be configured in a subframe. In such symbol(s), a UE may expect partial DL transmission unless the configuration is overridden by dynamic signaling or scheduling.

(2) In other time-domain symbol(s), unless there are dynamic signaling to indicate otherwise, the pattern may be determined by scheduling. For example, if a UE is scheduled with DL, symbols may be used for DL:UL=1:0, and if the UE is scheduled with UL, symbols may be used for DL:UL=1:0. However, a symbol may be fully utilized for DM-RS transmission either for DL or UL.

(3) If there is a dynamic signaling to indicate each symbol's DL:UL pattern, additional indication on DM-RS pattern may also be configured. The DM-RS patterns may be 1) DL DM-RS only+full symbol for DM-RS transmission (assume the location of DM-RS position is configured in prior), 2) UL DM-RS only+full symbol for DM-RS transmission, or 3) DM-RS and data may transmitted within the same symbol.

If this is used without dynamic signaling, a network may puncture on-going DL or UL of one UE to support another UE's DL or UL at symbols where either full DL or full UL is assumed.

5. RS Transmission

Regardless of which technique is used for DL/UL switching, it may be beneficial to use the same symbol(s) (in terms of symbol index or position) for DM-RS transmission for either DL or UL. Thus, the present invention proposes to fix DM-RS symbols as fixed DL or fixed UL, regardless of configuration, particularly for DL/UL switching via TDM at (sub-)symbol level.

In terms of DM-RS transmission, the following two options may be considered.

(1) Data and DM-RS may be multiplexed via TDM in different symbols. That is, DM-RS and data may be transmitted in different symbols (2) Data and DM-RS may be transmitted in the same symbol (either via 1-DM or in TDM, etc.)

For option (1), if DM-RS is present in the first symbol of data transmission, the possible first symbol (e.g. second or third symbol from the beginning) may be used for DM-RS transmission for DL, and 3rd or 4th symbol from the beginning may be used for UL DM-RS transmission (depending on DM-RS transmission mechanism).

If there are additional DM-RS or phase compensation RS (PCRS) transmissions, those symbols may be fixed depending on scheduling information. PCRS may become difficult to utilize full symbols which would restrict the applicability of DL/UL switching at sub-symbol level. Thus, only base DM-RS may utilize the full symbol for DL/UL switching at sub-symbol level.

FIG. 18 shows an example of dynamic DL/UL pattern determination and location of DM-RS for each DL and UL according to an embodiment of the present invention. Referring to FIG. 18, various cases of dynamic DL/UL pattern determination and location of DM-RS for each DL and UL are shown.

If there is a gap between DL DM-RS to DL data transmission or UL DM-RS to UL data transmission, the phase continuity needs to be considered. As phase continuity can be maintained as long as the device does not turn off phase-locked loop (PLL) (i.e. does not shut off RF entirely), and the same power level may be used between two transmission burst, the device may maintain the same power level before and after the gap between two DL or UL transmission such that phase continuity can be maintained. Thus, when option (1) is used, it is necessary to maintain the same power level in spite of any zero-power transmission or no transmission in between DM-RS and data transmission.

For option (2), the first few symbols' DL:UL ratio may be rather semi-statically fixed, and the rest symbols may be dynamically changed via signaling. DM-RS sub-symbols of each transmission may be embedded with DL or UL transmission in each or in a few symbols via FDM/TDM manner depending on the mechanism. For example, if DL/UL switching via TDM/FDM at a symbol level is used, FDM between DM-RS and data in the same symbol may be considered. If DL/UL switching via TDM at a sub-symbol level is used, contiguous DM-RS sub-symbols may be inserted between data sub-symbols within a symbol.

Between option (1) and (2), different approach may be used depending on channel (e.g. option (2) for control, and option (1) for data) or depending on usage scenario (e.g. option (2) for URLLC transmission, and option (1) for eMBB data transmission) or may be configured by the network per channel or per usage scenario. Further, whether RS for DL and UL can share the same symbol (i.e. RS for DL and UL can be placed in the same symbol) or not may be configured depending on channel conditions or scenarios.

FIG. 19 shows a method for performing a fast DL/UL switching by a network node according to an embodiment of the present invention. The present invention described above may be applied to this embodiment.

In step S100, the network node transmits DL data in a first symbol. In step S110, the network node receives UL data in a second symbol, which is the next symbol of the first symbol.

The first symbol may be a first OFDM symbol and the second symbol may be a second OFDM symbol. That is, DL/UL switching may be performed at a symbol level. The first OFDM symbol and the second OFDM symbol may have DL/UL switching time. The DL/UL switching time may correspond to at least one CP of the second OFDM symbol. Or, a gap may be added between the first OFDM symbol and the second OFDM symbol. The transmission of the DL data in the first symbol and the reception of the UL data in the second symbol may use different numerologies.

Alternatively, the first symbol may be a transmission portion in a time domain symbol and the second symbol may be a reception portion in the time domain symbol. That is, DL/UL switching may be performed at a sub-symbol level. Transmitting the DL data in the first symbol and receiving the UL data in the second symbol may comprise generating a non-zero power symbols in the transmission portion and zero-power symbols in the reception portion after IFFT processing. A total number of the non-zero power symbols and the zero-power symbols may be equal to a number of subcarriers in system bandwidth.

The network node may further configure a DL/UL ratio in each symbol. The DL/UL ratio in each symbol may be configured by semi-statically. Or, the DL/UL ratio in each symbol may be configured by dynamically at mini-subframe or subframe or subframe group level. Or, the DL/UL ratio in each symbol may be configured by flexible DL/UL pattern in each symbol.

FIG. 20 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for performing a fast downlink/uplink (DL/UL) switching by a network node in a wireless communication system, the method comprising:
   transmitting DL data in a first symbol; and
   receiving UL data in a second symbol, which is the next symbol of the first symbol,
   wherein the first symbol is a transmission portion in a time domain symbol and the second symbol is a reception portion in the time domain symbol, and
   wherein the transmitting the DL data in the first symbol and receiving the UL data in the second symbol comprises generating a non-zero power symbols in the transmission portion and zero-power symbols in the reception portion after inverse fast Fourier transform (IFFT) processing.

2. The method of claim 1, wherein the first symbol is a first orthogonal frequency division multiplexing (OFDM) symbol and the second symbol is a second OFDM symbol.

3. The method of claim 2, wherein the first OFDM symbol and the second OFDM symbol have DL/UL switching time.

4. The method of claim 3, wherein the DL/UL switching time corresponds to at least one cyclic prefix (CP) of the second OFDM symbol.

5. The method of claim 2, wherein a gap is added between the first OFDM symbol and the second OFDM symbol.

6. The method of claim 1, wherein the transmission of the DL data in the first symbol and the reception of the UL data in the second symbol use different numerologies.

7. The method of claim 1, wherein a total number of the non-zero power symbols and the zero-power symbols is equal to a number of subcarriers in system bandwidth.

8. The method of claim 1, further comprising configuring a DL/UL ratio in each symbol.

9. The method of claim 8, wherein the DL/UL ratio in each symbol is configured by semi-statically.

10. The method of claim 8, wherein the DL/UL ratio in each symbol is configured by dynamically at mini-subframe or subframe or subframe group level.

11. The method of claim 8, wherein the DL/UL ratio in each symbol is configured by flexible DL/UL pattern in each symbol.

12. A network node in a wireless communication system, the network node comprising:
   a memory;
   a transceiver; and
   at least one processor, operatively coupled to the memory and the transceiver,
   wherein the at least one processor is configured to:
   control the transceiver to transmit downlink (DL) data in a first symbol, and
   control the transceiver to receive uplink (UL) data in a second symbol, which is the next symbol of the first symbol,
   wherein the first symbol is a transmission portion in a time domain symbol and the second symbol is a reception portion in the time domain symbol, and
   wherein the at least one processor is further configured to:
   generate a non-zero power symbols in the transmission portion and zero-power symbols in the reception portion after inverse fast Fourier transform (IFFT) processing.

* * * * *